United States Patent
Roberts

(10) Patent No.: US 9,900,258 B2
(45) Date of Patent: Feb. 20, 2018

(54) MULTI-TRUNK DATA FLOW REGULATION SYSTEM AND METHOD

(71) Applicant: FSA Technologies, Inc., Redwood City, CA (US)

(72) Inventor: Lawrence G. Roberts, Redwood City, CA (US)

(73) Assignee: FSA Technologies, Inc., Redwood City, CA (US)

( * ) Notice: Subject to any disclaimer, the term of this patent is extended or adjusted under 35 U.S.C. 154(b) by 0 days.

(21) Appl. No.: 15/276,052

(22) Filed: Sep. 26, 2016

(65) Prior Publication Data

US 2017/0093729 A1    Mar. 30, 2017

Related U.S. Application Data

(60) Provisional application No. 62/232,827, filed on Sep. 25, 2015, provisional application No. 62/342,486,
(Continued)

(51) Int. Cl.
| | |
|---|---|
| *H04L 12/825* | (2013.01) |
| *H04L 12/721* | (2013.01) |
| *H04L 12/801* | (2013.01) |
| *H04L 12/26* | (2006.01) |
| *H04L 12/50* | (2006.01) |

(Continued)

(52) U.S. Cl.
CPC ............ *H04L 47/25* (2013.01); *H04L 1/16* (2013.01); *H04L 7/04* (2013.01); *H04L 12/50* (2013.01); *H04L 12/66* (2013.01); *H04L 43/0835* (2013.01); *H04L 43/0894* (2013.01); *H04L 45/22* (2013.01); *H04L 45/38* (2013.01); *H04L 47/193* (2013.01); *H04L 45/245* (2013.01);
(Continued)

(58) Field of Classification Search
None
See application file for complete search history.

(56) References Cited

U.S. PATENT DOCUMENTS

| | | |
|---|---|---|
| 5,319,638 A | 6/1994 | Lin |
| 5,361,255 A | 11/1994 | Diaz et al. |

(Continued)

FOREIGN PATENT DOCUMENTS

| | | |
|---|---|---|
| WO | 2015131943 A1 | 9/2015 |
| WO | 2017053957 A1 | 3/2017 |

(Continued)

OTHER PUBLICATIONS

International Search Report and Written Opinion issued in counterpart application Serial No. PCT/US2016/053773 dated Dec. 9, 2016.

(Continued)

*Primary Examiner* — Brian Roberts
(74) *Attorney, Agent, or Firm* — Intellectual Innovations Legal Advisors

(57) ABSTRACT

A method, computer program product, and computing system for receiving rate control information for an existing dataflow on a first gateway of a first wired communication trunk within a communication platform. The rate control information for the existing dataflow is provided from the first gateway of the first wired communication trunk to a second gateway of a second wired communication trunk within the communication platform.

24 Claims, 8 Drawing Sheets

Related U.S. Application Data filed on May 27, 2016, provisional application No. 62/342,506, filed on May 27, 2016, provisional application No. 62/342,499, filed on May 27, 2016, provisional application No. 62/342,493, filed on May 27, 2016.

(51) Int. Cl.

| | | |
|---|---|---|
| *H04L 12/66* | (2006.01) | |
| *H04L 1/16* | (2006.01) | |
| *H04L 7/04* | (2006.01) | |
| *H04L 12/707* | (2013.01) | |
| *H04L 12/807* | (2013.01) | |
| *H04L 12/851* | (2013.01) | |
| *H04L 12/709* | (2013.01) | |

(52) U.S. Cl.
CPC .......... *H04L 47/18* (2013.01); *H04L 47/2441* (2013.01); *H04L 47/27* (2013.01)

(56) References Cited

U.S. PATENT DOCUMENTS

| | | | |
|---|---|---|---|
| 5,367,517 A | 11/1994 | Cidon et al. | |
| 5,367,523 A | 11/1994 | Chang et al. | |
| 5,473,604 A | 12/1995 | Lorenz et al. | |
| 5,586,121 A | 12/1996 | Moura et al. | |
| 5,694,390 A * | 12/1997 | Yamato | H04L 12/5602 |
| | | | 370/230 |
| 5,734,825 A | 3/1998 | Lauck et al. | |
| 5,745,685 A | 4/1998 | Kirchner et al. | |
| 5,784,597 A | 7/1998 | Chiu et al. | |
| 5,799,002 A | 8/1998 | Krishnan | |
| 5,828,653 A | 10/1998 | Goss | |
| 5,838,681 A | 11/1998 | Bonomi et al. | |
| 5,903,559 A | 5/1999 | Acharya et al. | |
| 5,953,318 A | 9/1999 | Nattkemper et al. | |
| 5,953,335 A | 9/1999 | Erimli et al. | |
| 5,959,995 A | 9/1999 | Wicki et al. | |
| 5,968,128 A | 10/1999 | Lauck et al. | |
| 5,983,261 A | 11/1999 | Riddle | |
| 6,005,843 A | 12/1999 | Kamiya | |
| 6,028,841 A | 2/2000 | Lyon et al. | |
| 6,034,962 A | 3/2000 | Ohno et al. | |
| 6,038,216 A * | 3/2000 | Packer | H04L 1/0018 |
| | | | 370/231 |
| 6,046,983 A | 4/2000 | Hasegawa et al. | |
| 6,075,769 A * | 6/2000 | Ghanwani | H04L 47/263 |
| | | | 370/229 |
| 6,160,818 A | 12/2000 | Berger et al. | |
| 6,163,834 A | 12/2000 | Garcia et al. | |
| 6,172,616 B1 | 1/2001 | Johnson et al. | |
| 6,181,704 B1 | 1/2001 | Drottar et al. | |
| 6,182,144 B1 | 1/2001 | England | |
| 6,198,735 B1 | 3/2001 | Pazhyannur et al. | |
| 6,208,620 B1 | 3/2001 | Sen et al. | |
| 6,215,772 B1 | 4/2001 | Verma | |
| 6,219,713 B1 | 4/2001 | Ruutu et al. | |
| 6,272,148 B1 | 8/2001 | Takagi et al. | |
| 6,397,260 B1 | 5/2002 | Wils et al. | |
| 6,397,277 B1 | 5/2002 | Kato et al. | |
| 6,400,724 B1 | 6/2002 | Yao | |
| 6,415,331 B1 | 7/2002 | Ariga | |
| 6,452,915 B1 | 9/2002 | Jorgensen | |
| 6,469,992 B1 | 10/2002 | Schieder | |
| 6,512,758 B1 | 1/2003 | Sato et al. | |
| 6,542,467 B2 | 4/2003 | Umayabashi | |
| 6,563,787 B1 | 5/2003 | Ramaswamy et al. | |
| 6,574,668 B1 | 6/2003 | Gubbi et al. | |
| 6,615,271 B1 | 9/2003 | Lauck et al. | |
| 6,657,960 B1 | 12/2003 | Jeffries et al. | |
| 6,658,010 B1 | 12/2003 | Enns et al. | |
| 6,674,718 B1 | 1/2004 | Heddes et al. | |
| 6,687,781 B2 | 2/2004 | Wynne et al. | |
| 6,697,331 B1 | 2/2004 | Riihinen et al. | |
| 6,700,871 B1 | 3/2004 | Harper et al. | |
| 6,701,389 B2 | 3/2004 | Gorti et al. | |
| 6,724,762 B2 | 4/2004 | Garcia et al. | |
| 6,724,776 B1 | 4/2004 | Jeffries | |
| 6,741,563 B2 | 5/2004 | Packer | |
| 6,754,200 B1 * | 6/2004 | Nishimura | H04L 1/0002 |
| | | | 370/238 |
| 6,754,699 B2 | 6/2004 | Swildens et al. | |
| 6,757,250 B1 | 6/2004 | Fayad et al. | |
| 6,771,652 B1 | 8/2004 | Aydemir et al. | |
| 6,785,288 B1 | 8/2004 | Enns et al. | |
| 6,785,323 B1 | 8/2004 | Proctor, Jr. | |
| 6,788,646 B1 | 9/2004 | Fodor et al. | |
| 6,829,250 B2 | 12/2004 | Voit et al. | |
| 6,839,767 B1 | 1/2005 | Davies et al. | |
| 6,856,599 B1 | 2/2005 | Kroon | |
| 6,865,188 B1 | 3/2005 | Stirling et al. | |
| 6,888,794 B1 | 5/2005 | Jovanovic et al. | |
| 6,934,257 B2 | 8/2005 | Liu et al. | |
| 6,952,401 B1 | 10/2005 | Kadambi et al. | |
| 6,954,797 B1 | 10/2005 | Takeda et al. | |
| 6,959,002 B2 | 10/2005 | Wynne et al. | |
| 6,965,916 B1 | 11/2005 | Kling et al. | |
| 6,973,140 B2 | 12/2005 | Hoffman et al. | |
| 6,975,647 B2 | 12/2005 | Neale et al. | |
| 7,002,971 B1 | 2/2006 | Enns et al. | |
| 7,006,476 B1 | 2/2006 | Tateishi | |
| 7,016,301 B1 | 3/2006 | Moore | |
| 7,020,083 B2 | 3/2006 | Garcia-Luna-Aceves et al. | |
| 7,023,803 B2 | 4/2006 | Kakani et al. | |
| 7,031,263 B1 | 4/2006 | Sun et al. | |
| 7,035,939 B2 | 4/2006 | Maeda | |
| 7,042,848 B2 | 5/2006 | Santiago et al. | |
| 7,042,891 B2 | 5/2006 | Oberman et al. | |
| 7,047,310 B2 | 5/2006 | Bedekar et al. | |
| RE39,135 E | 6/2006 | Riddle | |
| 7,058,085 B2 | 6/2006 | Earnshaw et al. | |
| 7,069,337 B2 | 6/2006 | Rawlins et al. | |
| 7,089,312 B2 | 8/2006 | Liu et al. | |
| 7,124,376 B2 | 10/2006 | Zaidi et al. | |
| 7,133,893 B2 | 11/2006 | Goldstein | |
| 7,133,922 B1 | 11/2006 | She et al. | |
| 7,162,535 B2 | 1/2007 | Kustov et al. | |
| 7,164,656 B2 | 1/2007 | Foster et al. | |
| 7,164,680 B2 | 1/2007 | Loguinov | |
| 7,190,689 B2 | 3/2007 | Sato et al. | |
| 7,200,672 B2 | 4/2007 | Senda | |
| 7,203,956 B2 | 4/2007 | Thomas et al. | |
| 7,218,610 B2 | 5/2007 | Sivakumar et al. | |
| 7,263,107 B1 | 8/2007 | Johnston et al. | |
| 7,274,691 B2 | 9/2007 | Rogers | |
| 7,304,948 B1 | 12/2007 | Ong | |
| 7,327,735 B2 | 2/2008 | Robotham et al. | |
| 7,369,498 B1 | 5/2008 | Ma et al. | |
| 7,385,963 B1 | 6/2008 | Carew et al. | |
| 7,392,424 B2 | 6/2008 | Ho et al. | |
| 7,395,325 B2 | 6/2008 | Grove et al. | |
| 7,400,632 B2 | 7/2008 | Krishnan | |
| 7,417,948 B2 | 8/2008 | Sjoblom | |
| 7,417,992 B2 | 8/2008 | Krishnan | |
| 7,418,518 B2 | 8/2008 | Grove et al. | |
| 7,437,493 B2 | 10/2008 | Pecone | |
| 7,463,584 B2 | 12/2008 | Allan et al. | |
| 7,480,267 B2 | 1/2009 | Funnell et al. | |
| 7,484,120 B2 | 1/2009 | Fong et al. | |
| 7,500,010 B2 | 3/2009 | Harrang et al. | |
| 7,502,858 B2 | 3/2009 | Gupta et al. | |
| 7,512,106 B2 | 3/2009 | Van Tran et al. | |
| 7,512,630 B2 | 3/2009 | Kling et al. | |
| 7,542,471 B2 | 6/2009 | Samuels et al. | |
| 7,554,918 B1 | 6/2009 | Moore | |
| 7,564,869 B2 | 7/2009 | Cafiero et al. | |
| 7,577,703 B2 | 8/2009 | Boucher et al. | |
| 7,602,818 B2 | 10/2009 | Dao et al. | |
| 7,616,638 B2 | 11/2009 | Samuels et al. | |
| 7,636,917 B2 | 12/2009 | Darling et al. | |
| 7,643,512 B2 | 1/2010 | Gorsetman et al. | |
| 7,664,026 B2 | 2/2010 | Huang et al. | |

(56) References Cited

U.S. PATENT DOCUMENTS

| | | |
|---|---|---|
| 7,680,053 B1 | 3/2010 | Pannell et al. |
| 7,680,141 B2 | 3/2010 | Miyake et al. |
| 7,693,142 B2 | 4/2010 | Beshai |
| 7,697,539 B1 | 4/2010 | Fayad et al. |
| 7,697,553 B2 | 4/2010 | Karlsen et al. |
| 7,724,665 B2 | 5/2010 | Tanaka |
| 7,734,805 B2 | 6/2010 | Balachandran et al. |
| 7,751,315 B1 | 7/2010 | Pai et al. |
| 7,760,636 B1 | 7/2010 | Cheriton |
| 7,764,665 B2 | 7/2010 | Rogers et al. |
| 7,782,774 B2 | 8/2010 | Cheriton |
| 7,784,076 B2 | 8/2010 | Demircin et al. |
| 7,784,084 B2 | 8/2010 | Ng et al. |
| 7,787,498 B2 | 8/2010 | Fourcand |
| 7,801,125 B2 | 9/2010 | Kreeger et al. |
| 7,813,356 B2 | 10/2010 | Roberts |
| 7,826,425 B2 | 11/2010 | Sekhar |
| 7,830,793 B2 | 11/2010 | Gai et al. |
| 7,839,952 B2 | 11/2010 | Sofer et al. |
| 7,864,771 B2 | 1/2011 | Tavares et al. |
| 7,869,537 B2 | 1/2011 | Catreux et al. |
| 7,876,751 B2 | 1/2011 | Benner et al. |
| 7,889,654 B2 | 2/2011 | Ramakrishnan et al. |
| 7,895,343 B2 | 2/2011 | Backlund |
| 7,908,372 B2 | 3/2011 | Huang et al. |
| 7,911,954 B2 | 3/2011 | Cheng et al. |
| 7,924,766 B2 | 4/2011 | Sahinoglu et al. |
| 7,948,896 B2 | 5/2011 | Andersen |
| 7,957,369 B2 | 6/2011 | Fayad et al. |
| 7,969,886 B1 | 6/2011 | Hoichman |
| 7,991,882 B1 | 8/2011 | Parkhill |
| 8,019,862 B2 | 9/2011 | Douceur et al. |
| 8,031,593 B2 | 10/2011 | Sjoblom |
| 8,036,113 B2 | 10/2011 | Kondapalli |
| 8,089,881 B2 | 1/2012 | Walton et al. |
| 8,099,492 B2 | 1/2012 | Dahlin et al. |
| 8,107,440 B2 | 1/2012 | Nadas et al. |
| 8,130,776 B1 | 3/2012 | Sundararajan et al. |
| 8,154,996 B2 | 4/2012 | Godbole et al. |
| 8,160,056 B2 | 4/2012 | Van der Merwe et al. |
| 8,169,906 B2 | 5/2012 | Droz et al. |
| 8,194,675 B2 | 6/2012 | Tavares et al. |
| 8,213,308 B2 | 7/2012 | Godbole et al. |
| 8,223,684 B2 | 7/2012 | Tashiro et al. |
| 8,223,759 B2 | 7/2012 | Beshai |
| 8,233,392 B2 | 7/2012 | Samuels et al. |
| 8,249,082 B2 | 8/2012 | DelRegno et al. |
| 8,274,970 B2 | 9/2012 | Bennett et al. |
| 8,284,802 B2 | 10/2012 | Huang et al. |
| 8,300,528 B2 | 10/2012 | Everett et al. |
| 8,307,077 B2 | 11/2012 | Douceur et al. |
| 8,364,812 B2 | 1/2013 | Loach |
| 8,379,515 B1 | 2/2013 | Mukerji |
| 8,385,270 B2 | 2/2013 | Pedlar et al. |
| 8,396,954 B2 | 3/2013 | Nagaraj et al. |
| 8,411,619 B2 | 4/2013 | Lee et al. |
| 8,437,736 B2 | 5/2013 | Rubin et al. |
| 8,437,738 B2 | 5/2013 | Rubin et al. |
| 8,451,809 B2 | 5/2013 | Pratt, Jr. et al. |
| 8,472,473 B2 | 6/2013 | Ketchum et al. |
| 8,477,608 B2 | 7/2013 | Ludwig et al. |
| 8,483,063 B2 | 7/2013 | Yano et al. |
| 8,488,447 B2 | 7/2013 | Bugenhagen |
| 8,489,685 B2 | 7/2013 | Bharadhwaj et al. |
| 8,509,074 B1 | 8/2013 | Roberts et al. |
| 8,514,889 B2 | 8/2013 | Jayasimha et al. |
| 8,526,451 B2 | 9/2013 | Sundararajan et al. |
| 8,532,121 B2 | 9/2013 | Bennett |
| 8,547,843 B2 | 10/2013 | Roberts et al. |
| 8,565,087 B2 | 11/2013 | Koitabashi et al. |
| 8,582,430 B2 | 11/2013 | Ketchum et al. |
| 8,614,941 B2 | 12/2013 | Heitz |
| 8,620,989 B2 | 12/2013 | Eisner et al. |
| 8,625,548 B2 | 1/2014 | Bennett |
| 8,631,106 B2 | 1/2014 | Huang et al. |
| 8,635,353 B2 | 1/2014 | Pope et al. |
| 8,645,558 B2 | 2/2014 | Pope et al. |
| 8,654,736 B2 | 2/2014 | Iwamura |
| 8,675,472 B2 | 3/2014 | Sun et al. |
| 8,706,901 B2 | 4/2014 | Krishnamurthy |
| 8,719,447 B2 | 5/2014 | Gupta et al. |
| 8,750,243 B2 | 6/2014 | Aghvami et al. |
| 8,755,396 B2 | 6/2014 | Sindhu et al. |
| 8,780,705 B2 | 7/2014 | Robin et al. |
| 8,782,184 B2 | 7/2014 | Furlong et al. |
| 8,787,400 B1 | 7/2014 | Barth et al. |
| 8,788,459 B2 | 7/2014 | Patel et al. |
| 8,804,503 B2 | 8/2014 | Kalkunte et al. |
| 8,804,508 B1 | 8/2014 | Hobbs |
| 8,825,829 B2 | 9/2014 | Gupta et al. |
| 8,831,008 B1 | 9/2014 | Gostev et al. |
| 8,837,382 B2 | 9/2014 | Rangan |
| 8,850,498 B1 | 9/2014 | Roach et al. |
| 8,873,394 B2 | 10/2014 | Masputra et al. |
| 8,873,753 B2 | 10/2014 | Parker |
| 8,902,753 B2 | 12/2014 | Strasman |
| 8,903,918 B2 | 12/2014 | Bharadhwaj et al. |
| 8,908,522 B2 | 12/2014 | Smith, Jr. et al. |
| 8,959,155 B1 | 2/2015 | Kwok et al. |
| 8,976,655 B2 | 3/2015 | Weill et al. |
| 8,996,722 B2 | 3/2015 | Lakshman et al. |
| 9,008,005 B2 | 4/2015 | Grayson et al. |
| 9,013,978 B2 | 4/2015 | Heitz |
| 9,019,908 B2 | 4/2015 | Chan |
| 9,019,961 B2 | 4/2015 | Colloff et al. |
| 9,043,380 B2 | 5/2015 | Pope et al. |
| 9,049,015 B2 | 6/2015 | Tavares et al. |
| 9,049,271 B1 | 6/2015 | Hobbs et al. |
| 9,059,968 B2 | 6/2015 | Pannatu Sethumadhavan et al. |
| 9,065,594 B1 | 6/2015 | Husted et al. |
| 9,071,526 B2 | 6/2015 | Avdanin et al. |
| 9,088,859 B2 | 7/2015 | Egner et al. |
| 9,124,503 B2 | 9/2015 | Rungta et al. |
| 9,137,675 B2 | 9/2015 | Rubin et al. |
| 9,167,591 B2 | 10/2015 | Egner et al. |
| 9,179,365 B1 | 11/2015 | Bidichandani et al. |
| 9,191,369 B2 | 11/2015 | Bharadhwaj et al. |
| 9,210,714 B2 | 12/2015 | Egner et al. |
| 9,219,541 B2 | 12/2015 | Rubin et al. |
| 9,224,163 B2 | 12/2015 | Padmanabhan et al. |
| 2001/0033583 A1 | 10/2001 | Rabenko et al. |
| 2002/0057651 A1 | 5/2002 | Roberts |
| 2002/0080721 A1* | 6/2002 | Tobagi ............ H04L 29/06 370/236 |
| 2002/0087370 A1 | 7/2002 | Brueckheimer |
| 2002/0193107 A1 | 12/2002 | Nascimento, Jr. |
| 2003/0031161 A1 | 2/2003 | Froehlich et al. |
| 2003/0037165 A1 | 2/2003 | Shinomiya |
| 2003/0118042 A1 | 6/2003 | Nishida et al. |
| 2003/0193947 A1 | 10/2003 | Kikinis |
| 2003/0212739 A1 | 11/2003 | Boucher et al. |
| 2004/0117498 A1 | 6/2004 | Hashimoto et al. |
| 2004/0146006 A1 | 7/2004 | Jackson |
| 2004/0240385 A1 | 12/2004 | Boggs et al. |
| 2005/0018697 A1 | 1/2005 | Enns et al. |
| 2005/0060426 A1 | 3/2005 | Samuels |
| 2005/0068894 A1 | 3/2005 | Yu et al. |
| 2005/0078629 A1 | 4/2005 | Bi et al. |
| 2005/0174972 A1 | 8/2005 | Boynton |
| 2005/0201336 A1 | 9/2005 | Lee |
| 2005/0262266 A1 | 11/2005 | Wiberg et al. |
| 2006/0002301 A1 | 1/2006 | Liu et al. |
| 2006/0117361 A1 | 6/2006 | Dolgonos |
| 2006/0146802 A1 | 7/2006 | Baldwin et al. |
| 2006/0182025 A1 | 8/2006 | Kim et al. |
| 2006/0268780 A1 | 11/2006 | Chou et al. |
| 2007/0058661 A1 | 3/2007 | Chow |
| 2007/0061430 A1 | 3/2007 | Kim |
| 2007/0110046 A1 | 5/2007 | Farrell et al. |
| 2007/0115848 A1 | 5/2007 | Chean et al. |
| 2007/0121639 A1 | 5/2007 | Degrande et al. |
| 2007/0166036 A1 | 7/2007 | Combs et al. |
| 2007/0195815 A1 | 8/2007 | Turner et al. |

(56) References Cited

U.S. PATENT DOCUMENTS

| | | |
|---|---|---|
| 2007/0198875 A1* | 8/2007 | Jung .............. H04M 3/12 714/51 |
| 2007/0259665 A1 | 11/2007 | Chiu et al. |
| 2007/0263572 A1 | 11/2007 | Ren et al. |
| 2008/0034105 A1 | 2/2008 | Tsai et al. |
| 2008/0049624 A1 | 2/2008 | Ray et al. |
| 2008/0144660 A1* | 6/2008 | Godlewski ........ H04L 47/10 370/468 |
| 2008/0162717 A1 | 7/2008 | Tsai et al. |
| 2008/0253373 A1 | 10/2008 | Ros-Giralt et al. |
| 2009/0138574 A1 | 5/2009 | Hui et al. |
| 2009/0147795 A1 | 6/2009 | Mevissen et al. |
| 2010/0049830 A1 | 2/2010 | Chenu et al. |
| 2010/0157797 A1 | 6/2010 | Dinescu |
| 2010/0165848 A1 | 7/2010 | Iwazaki et al. |
| 2010/0322153 A1 | 12/2010 | Narasimha et al. |
| 2010/0322163 A1 | 12/2010 | Bhalla et al. |
| 2011/0090892 A1 | 4/2011 | Cooke |
| 2011/0196837 A1 | 8/2011 | Savunen et al. |
| 2012/0110403 A1 | 5/2012 | Chen et al. |
| 2012/0155458 A1 | 6/2012 | Larson et al. |
| 2012/0179784 A1 | 7/2012 | Picconi et al. |
| 2012/0275324 A1 | 11/2012 | Hashimoto et al. |
| 2013/0003538 A1 | 1/2013 | Greenberg et al. |
| 2013/0003543 A1 | 1/2013 | Ludwig |
| 2013/0028258 A1 | 1/2013 | Carney et al. |
| 2013/0036174 A1 | 2/2013 | Hurwitze et al. |
| 2013/0055373 A1 | 2/2013 | Beacham et al. |
| 2013/0086279 A1 | 4/2013 | Archer et al. |
| 2013/0212446 A1 | 8/2013 | Verwaest |
| 2013/0264971 A1 | 10/2013 | Yeh et al. |
| 2013/0265938 A1 | 10/2013 | Jain et al. |
| 2013/0268984 A1 | 10/2013 | Salinger et al. |
| 2013/0336213 A1 | 12/2013 | Mimura et al. |
| 2014/0177477 A1 | 6/2014 | Cachin et al. |
| 2014/0195630 A1 | 7/2014 | Malik et al. |
| 2014/0241163 A1 | 8/2014 | Cary et al. |
| 2015/0043345 A1 | 2/2015 | Testicioglu et al. |
| 2015/0063358 A1 | 3/2015 | Wu et al. |
| 2015/0085646 A1 | 3/2015 | Vannithamby et al. |
| 2015/0085665 A1 | 3/2015 | Kompella et al. |
| 2015/0089500 A1 | 3/2015 | Kompella et al. |
| 2015/0095739 A1 | 4/2015 | Zhovnirnovsky et al. |
| 2015/0103660 A1 | 4/2015 | Roskind et al. |
| 2015/0117200 A1 | 4/2015 | Patel et al. |
| 2015/0163019 A1 | 6/2015 | Birrittella |
| 2015/0213051 A1 | 7/2015 | Wang et al. |
| 2015/0263987 A1 | 9/2015 | Klein et al. |
| 2017/0093532 A1 | 3/2017 | Roberts |
| 2017/0093726 A1 | 3/2017 | Roberts |
| 2017/0093728 A1 | 3/2017 | Roberts |
| 2017/0093730 A1 | 3/2017 | Roberts |

FOREIGN PATENT DOCUMENTS

| | | |
|---|---|---|
| WO | 2017053960 A1 | 3/2017 |
| WO | 2017053964 A1 | 3/2017 |
| WO | 2017053968 A1 | 3/2017 |
| WO | 2017053977 A1 | 3/2017 |

OTHER PUBLICATIONS

International Search Report and Written Opinion issued in counterpart application Serial No. PCT/US2016/053760 dated Dec. 9, 2016.
International Search Report and Written Opinion issued in counterpart application Serial No. PCT/US2016/053765 dated Dec. 9, 2016.
International Search Report and Written Opinion issued in counterpart application Serial No. PCT/US2016/053779 dated Dec. 28, 2016.
International Search Report and Written Opinion issued in counterpart application Serial No. PCT/US2016/053789 dated Dec. 20, 2016.
Non-Final Office Action issued in counterpart U.S. Appl. No. 15/276,217, dated Jan. 26, 2017.
Non-Final Office Action issued in counterpart U.S. Appl. No. 15/276,285, dated Jan. 13, 2017.
Non-Final Office Action issued in counterpart U.S. Appl. No. 15/276,166, dated Apr. 20, 2017.
Notice of Allowance issued in counterpart U.S. Appl. No. 15/276,092 dated Aug. 23, 2017.
Final Office Action issued in counterpart U.S. Appl. No. 15/276,217 dated Jul. 25, 2017.
Final Office Action issued in counterpart U.S. Appl. No. 15/276,285 dated Aug. 25, 2017.
Notice of Allowance issued in counterpart U.S. Appl. No. 15/276,092 dated May 5, 2017.

* cited by examiner

MULTI-TRUNK DATA FLOW REGULATION SYSTEM AND METHOD

RELATED APPLICATION(S)

This application claims the benefit of the following U.S. Provisional Application Nos.: 62/232,827 filed on 25 Sep. 2015, 62/342,486 filed on 27 May 2016, 62/342,506 filed on 27 May 2016, 62/342,499 filed on 27 May 2016, and 62/342,493 filed on 27 May 2016; their contents of which are incorporated herein by reference.

TECHNICAL FIELD

This disclosure relates to data communication systems and, more particularly, to data communication systems that control the individual dataflows contained therein.

BACKGROUND

The transmission, storing and safeguarding of electronic content is of paramount importance in modern business specifically and the modern world generally. Accordingly, various systems and methodologies may be employed to transmit, store and safeguard such electronic content.

Such electronic content may be transferred between users/locations via one or more data networks, examples of which may include but are not limited to private networks and public networks. Unfortunately, the current manner in which this packetized data is moved within/across these networks often result in erratic and unpredictable network behavior, wherein packets are lost and dataflow rates are drastically reduced in response to the same.

SUMMARY OF DISCLOSURE

In one implementation, a computer-implemented method is executed on a computing device and includes receiving rate control information for an existing dataflow on a first gateway of a first wired communication trunk within a communication platform. The rate control information for the existing dataflow is provided from the first gateway of the first wired communication trunk to a second gateway of a second wired communication trunk within the communication platform.

One or more of the following features may be included. The rate control information may be generated on a second gateway of the first wired communication trunk. The rate control information may be provided from the second gateway of the first wired communication trunk to the first gateway of the first wired communication trunk. A new dataflow may be identified within the communication platform. A rate of the existing dataflow may be decreased to free up bandwidth for the new dataflow within one or more of the first wired communication trunk and the second wired communication trunk. The rate control information may include one or more of an RWND value associated with the existing dataflow and an acknowledgement delay associated with the existing dataflow. The intended recipient of the rate control information may be a sending device coupled to the communication platform. Decreasing the rate of the existing dataflow may include one or more of decreasing the RWND value and increasing the acknowledgement delay.

In another implementation, a computer program product resides on a computer readable medium and has a plurality of instructions stored on it. When executed by a processor, the instructions cause the processor to perform operations including receiving rate control information for an existing dataflow on a first gateway of a first wired communication trunk within a communication platform. The rate control information for the existing dataflow is provided from the first gateway of the first wired communication trunk to a second gateway of a second wired communication trunk within the communication platform.

One or more of the following features may be included. The rate control information may be generated on a second gateway of the first wired communication trunk. The rate control information may be provided from the second gateway of the first wired communication trunk to the first gateway of the first wired communication trunk. A new dataflow may be identified within the communication platform. A rate of the existing dataflow may be decreased to free up bandwidth for the new dataflow within one or more of the first wired communication trunk and the second wired communication trunk. The rate control information may include one or more of an RWND value associated with the existing dataflow and an acknowledgement delay associated with the existing dataflow. The intended recipient of the rate control information may be a sending device coupled to the communication platform. Decreasing the rate of the existing dataflow may include one or more of decreasing the RWND value and increasing the acknowledgement delay.

In another implementation, a computing system including a processor and memory is configured to perform operations including receiving rate control information for an existing dataflow on a first gateway of a first wired communication trunk within a communication platform. The rate control information for the existing dataflow is provided from the first gateway of the first wired communication trunk to a second gateway of a second wired communication trunk within the communication platform.

One or more of the following features may be included. The rate control information may be generated on a second gateway of the first wired communication trunk. The rate control information may be provided from the second gateway of the first wired communication trunk to the first gateway of the first wired communication trunk. A new dataflow may be identified within the communication platform. A rate of the existing dataflow may be decreased to free up bandwidth for the new dataflow within one or more of the first wired communication trunk and the second wired communication trunk. The rate control information may include one or more of an RWND value associated with the existing dataflow and an acknowledgement delay associated with the existing dataflow. The intended recipient of the rate control information may be a sending device coupled to the communication platform. Decreasing the rate of the existing dataflow may include one or more of decreasing the RWND value and increasing the acknowledgement delay.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Standard Communication Platform:

In standard TCP communication platforms today, a SYN packet may be transmitted and in a Round Trip Time a SYN-ACK packet may be received to confirm receipt of the SYN packet. Once received, two data packets may be transmitted and in a Round Trip Time an ACK packet may be received, thus allowing for the transmission of four data packets. And as long as no errors are encountered, the quantity of data packets transmitted per burst may continue to double every Round Trip Time.

However, when the network and/or the receiving device overloads, one or more data packets may be lost, which may signal the sending device to implement various operations (e.g., reducing their transmission rate by 50% and/or changing to a slower rate of increase). Unfortunately, the transmission rate will still be increased over time . . . and the network and/or the receiving device will once again overload. Further, when the sending device launched the burst of data packets that resulted in the network and/or the receiving device overloading, this burst would typically be a large quantity of data packets that was sent at twice the prior transmission rate, resulting in the loss of a large quantity of data packets. Further complicating the situation is that recovering from such a large data packet loss may be difficult and may further overload the network and/or receiving device. This situation may cause more overloads, more lost data packets, and more 50% reductions in transmission rate, resulting in a saw tooth data transmission waveform having a cycle that is equal to the amount of time that it takes for the data transfer rate to increase to the point of overload and reset.

Figure 1:
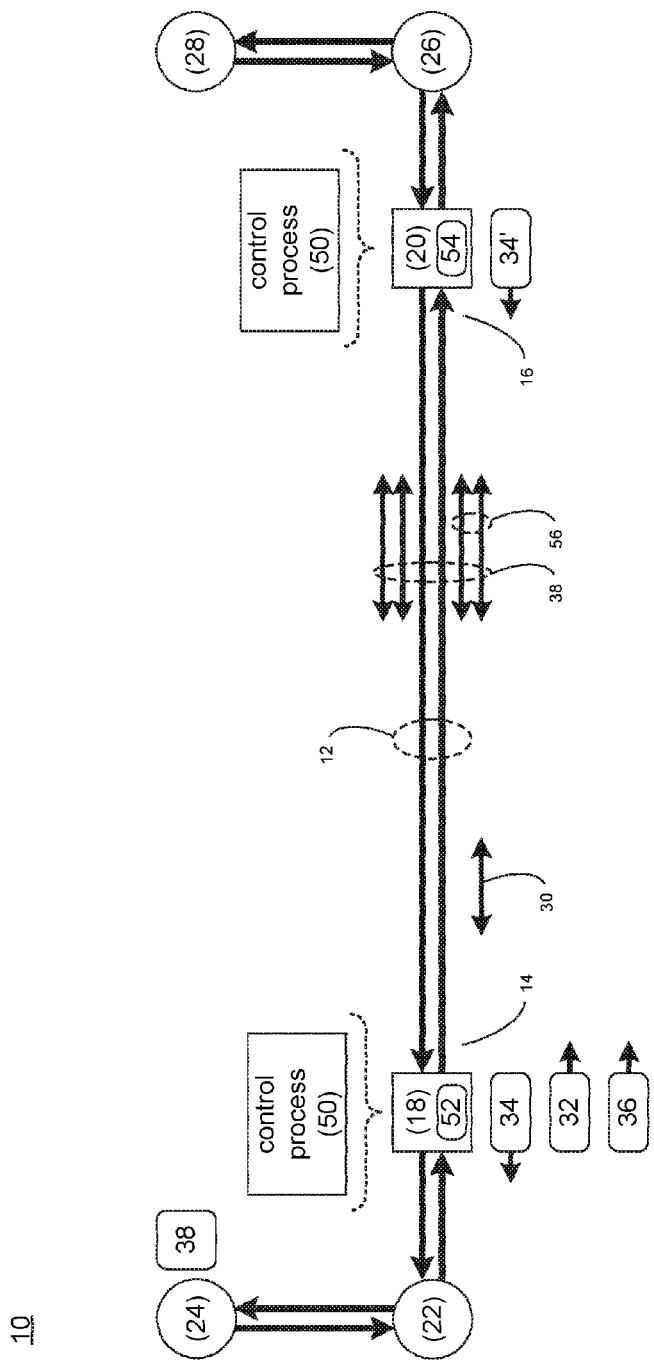
FIG. 1 is a diagrammatic view of a wired communication platform and a control process.

High-Speed Communication Platform:

Referring to FIG. 1, there is shown communication platform 10. Communication platform 10 may include wired communication trunk 12 having a first end (e.g., first end 14) and a second end (e.g., second end 16). First acknowledgement device 18 may be coupled to first end 14 of wired communication trunk 12 and second acknowledgement device 20 may be coupled to second end 16 of wired communication trunk 12. An example of first acknowledgement device 18 and second acknowledgement device 20 may include but is not limited to a gateway. Examples of wired communication trunk 12 may include: an electrical communication trunk (e.g., a communication trunk in which data is transmitted as electrical signals); an optical communication trunk (e.g., a communication trunk in which data is transmitted as optical signals); and a submarine cable (e.g., an underwater communication trunk in which data is transmitted as electrical and/or optical signals).

First router/switch 22 may be coupled to first acknowledgement device 18 (e.g., a gateway) and sending device 24 may be coupled to first router/switch 22. Second router/switch 26 may be coupled to second acknowledgement device 20 (e.g., a gateway) and receiving device 28 may be coupled to second router/switch 26. Examples of sending device 24 and receiving device 28 may include but are not limited to a personal electronic device, a general purpose computing device, a server computer, and a series of server computers.

As is known in the art, when data is transferred between e.g., sending device 24 and receiving device 28, various messages and data packets may be transferred between devices 24, 28. For example, assume that sending device 24 wishes to communicate with receiving device 28. Accordingly, a dataflow (e.g., dataflow 30) may need to be established between sending device 24 and receiving device 28.

In order to establish dataflow 30, a triple handshake procedure may be employed, wherein sending device 24 may send a packet (e.g., synchronize (SYN) packet 32) to receiving device 28; synchronization acknowledgement (SYN-ACK) packet 34 may be received by sending device 24; and sending device 24 may send acknowledgement (ACK) packet 36 to receiving device 28; thus establishing dataflow 30.

In a traditional (i.e., prior art) communication platform that does not include first acknowledgement device 18 and second acknowledgement device 20, synchronization acknowledgement (SYN-ACK) packet 34 would need to be generated by receiving device 28, resulting in poor performance and lackadaisical response times. For example, assume that the time-of-flight delay between sending device 24 and first acknowledgement device 18 in 1.0 milliseconds, the time-of-flight delay between first acknowledgement device 18 and second acknowledgement device 20 is 30.0 milliseconds, and the time-of-flight delay between second acknowledgement device 20 and receiving device 28 is also 1.0 milliseconds. Accordingly, when SYN packet 32 is transmitted by sending device 24, it would take 32.0 milliseconds for SYN packet 32 to reach receiving device 28. Assuming that upon receiving SYN packet 32, receiving device 28 transmits SYN-ACK packet 34 to sending device 24, which would take 32.0 milliseconds to arrive. Accordingly, the quantity of time between sending device 24 transmitting SYN packet 32 and sending device 24 receiving SYN-ACK packet 34 is 64.0 milliseconds.

However and as discussed above, communication platform 10 includes first acknowledgement device 18 and second acknowledgement device 20. Accordingly and in communication platform 10, when SYN packet 32 is generated and transmitted by sending device 24 and is received by first acknowledgement device 18, first acknowledgement device 18 may transmit SYN packet 32 to second acknowledgement device 20 (en route to receiving device 28). First acknowledgement device 18 may also generate SYN-ACK packet 34 and transmit the same to sending device 24. In this particular example and configuration, SYN-ACK packet 34 will be received by sending device 24 2.0 milliseconds after the transmission of SYN packet 32 (as opposed to 64.0 milliseconds after the transmission of SYN packet 32 in the traditional (i.e., prior art) communication platform).

First acknowledgement device 18 may be configured to store a copy of SYN packet 32. Upon SYN packet 32 reaching receiving device 28, receiving device 28 may also generate and transmit a SYN-ACK packet (e.g., SYN-ACK packet 34'). However, upon SYN-ACK packet 34' being received by first acknowledgement device 18, SYN-ACK packet 34' may be discarded (as SYN-ACK packet 34 was already sent to sending device 24 by first acknowledgement device 18). Further, the copy of SYN packet 32 that was stored within first acknowledgement device 18 may be deleted (as it is no longer needed since SYN-ACK packet 34' confirmed that SYN packet 32 was received by receiving device 28.

While the above-discussion concerns SYN packet 32 being processed by first acknowledgement device 18 and SYN-ACK packet 34 being generated by first acknowledgement device 18, this is for illustrative purposes only and is but one example of the manner is which the SYN, SYN-ACK, ACK process may be implemented on communication platform 10. And while such a configuration may result in a considerable increase in responsiveness (i.e., a 2.0 millisecond loop time as opposed to a 64.0 millisecond loop time), communication platform 10 may be configured so that SYN packet 32 is only processed by receiving device 28 resulting in a loop time of 64.0 milliseconds. However, subsequent transmissions of data packets would indeed be processed by first acknowledgement device 18 and their related acknowledgement (ACK) packets would be generated by first acknowledgement device 18, thus resulting in the above-described 64.0 millisecond to 2.0 millisecond loop time reduction.

Flow Control Methodology:

During operation of communication platform 10, at any given time, a plurality of dataflows (e.g., plurality of dataflows 38) may be present within wired communication trunk 12, wherein the particular bandwidth being consumed by each dataflow included within plurality of dataflows 38 may vary during utilization. For example, if dataflow 30 is established to transfer a file (e.g., file 38) from sending device 24 to receiving device 28, the bandwidth consumed by dataflow 30 may initially be slow as the above-described SYN, SYN-ACK, ACK procedure is performed, wherein the bandwidth consumed by dataflow 30 may be increased until reaching a transfer limit (as will be described below) and maintained until the transfer of file 38, is complete.

Figure 2:
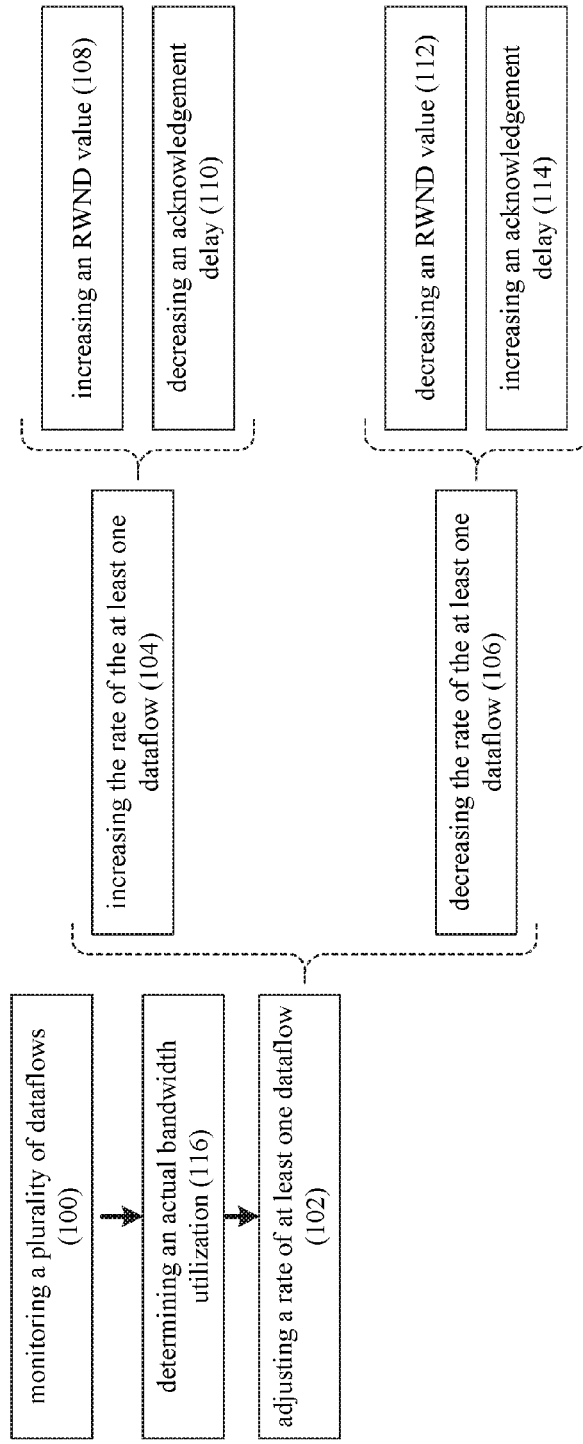
FIG. 2 is a flow chart of one embodiment of the control process of FIG. 1.

Referring also to FIG. 2, one or more of first acknowledgement device 18 and second acknowledgement device 20 may execute control process 50, wherein control process 50 may be configured to regulate the bandwidth of each dataflow included within plurality of flows 38.

The instruction sets and subroutines of control process 50, which may be stored on a storage device (e.g., storage device 52, 54) included within first acknowledgement device 18 and/or second acknowledgement device 20 (respectively), may be executed by one or more processors (not shown) and one or more memory architectures (not shown) included within first acknowledgement device 18 and/or second acknowledgement device 20. Examples of storage device 52, 54 may include but are not limited to: a hard disk drive; a random access memory (RAM); a read-only memory (ROM); and all forms of flash memory storage devices.

During operation of communication platform 10, control process 50 may monitor 100 a plurality of dataflows (e.g., plurality of dataflows 38) within wired communication trunk 12 for the occurrence of one or more conditions that may e.g., indicate the need to adjust the bandwidth of one or more of the flows included within plurality of flows 38. Accordingly and in response to the occurrence of these one or more conditions, control process 50 may adjust 102 a rate of at least one dataflow chosen from the plurality of dataflows (e.g., plurality of dataflows 38). As will be discussed below in greater detail and depending upon whether the occurrence is a systemic occurrence or a discrete occurrence, these adjustments may be made to all of the dataflows within e.g., plurality of dataflows 38; or may be made to one or more discrete dataflows within e.g., plurality of dataflows 38.

An example of a discrete occurrence may include but is not limited to: the loss of data packets between sending device 24 of a discrete dataflow (e.g., dataflow 30) and wired communication trunk 12 (e.g., first acknowledgement device 18); the loss of data packets between receiving device 28 of a discrete dataflow (e.g., dataflow 30) and wired communication trunk 12 (e.g., second acknowledgement device 20); and the storing of data packets of a discrete dataflow (e.g., dataflow 30) within a gateway coupled to wired communication trunk 12. An example of a systemic occurrence may include but is not limited to the actual bandwidth utilization of wired communication trunk 12 exceeding a target bandwidth utilization for wired communication trunk 12.

When adjusting 102 a rate of at least one dataflow (e.g., dataflow 30) chosen from plurality of dataflows 38, control process 50 may increase 104 the rate of the at least one dataflow (e.g., dataflow 30). Alternatively and when adjusting 102 a rate of at least one dataflow (e.g., dataflow 30) chosen from plurality of dataflows 38, control process 50 may decrease 106 the rate of the at least one dataflow (e.g., dataflow 30).

For the following example, dataflow 30 will be adjusted 102 and the manner in which dataflow 30 is increased 104 and/or decreased 106 shall be discussed. As discussed above and continuing with the example in which sender 24 is sending file 38, to receiver 28, the above-described SYN, SYN-ACK, ACK procedure may be utilized to establish dataflow 30. Once dataflow 30 is established, the process of transferring file 38, from sending device 24 to receiving device 28 may begin.

Typically and in accordance with standard IP operations, sending device 24 may ramp up their transfer rate through the successive doubling of the quantity of packets transferred in a single operation. For example, sending device 24 may first send one data packet . . . and once acknowledged may send two data packets . . . and once acknowledged may send four data packets . . . and once acknowledged may send eight data packets . . . and once acknowledged may send sixteen data packets . . . and once acknowledged may send thirty-two data packets . . . and once acknowledged may send sixty-four data packets . . . and once acknowledged may send one-hundred-twenty-eight data packets . . . and so on. At a certain transfer rate, this repeated doubling of the transfer rate may be slowed to a slower rate of increase.

Unfortunately and in a traditional (i.e., prior art) communication platform that does not include first acknowledgement device 18 and second acknowledgement device 20, this increasing of transfer rates (be it doubling or at a lesser level) would continue to occur until packet loss occur, at which point the transfer rate of dataflow 30 may be reduced by 50%.

However, as communication platform 10 includes first acknowledgement device 18 and second acknowledgement device 20, the rate of dataflow 30 (and the dataflows included within plurality of dataflows 38) may be individually controlled. Generally speaking and as will be discussed below in greater detail, control process 50 may be configured to control the transfer rate of discrete dataflows (e.g., dataflow 30) through the use of an RWND value and acknowledgement delays.

Specifically and once dataflow 30 is established, sending device 24 may start transferring file 38, as groups of data packets. As discussed above, sending device 24 may attempt to continuously double the quantity of packets transferred but control process 50 may control the rate of these dataflows. For example, assume that sending device 24 sends out one-hundred-twenty-eight data packets of file 38. For the next data transfer, sending device 24 would want to transfer two-hundred-fifty-six data packets. However and as discussed above, sending device 24 will not be able to send out any more data packets until sending device 24 receives an acknowledgement of receipt of the one-hundred-twenty-eight packets. In a traditional (i.e., prior art) communication platform that does not include first acknowledgement device 18 and second acknowledgement device 20, that acknowledgement would be generated by receiving device 28 and it would take approximately 64.0 milliseconds to receive. However, in communication platform 10, that acknowledgement is generated by first acknowledgement device 18 and it could take as little as 2.0 milliseconds to receive, thus allowing the transfer rate of dataflow 30 to more efficiently ramp up.

As discussed above, control process 50 may be configured to control the transfer rate of discrete dataflows (e.g., dataflow 30) through the use of an RWND value and acknowledgement delays. As is known in the art, RWND (i.e., Receiver Window) is a TCP state variable that defines the amount of data (in packets) that the destination can receive in one operation. In typical communication platforms, that destination is receiving device 28. Therefore and in these traditional (i.e., prior art) communication platforms, the communication platform cannot control the transfer rate of the individual dataflows (as that is controlled by the receivers of the dataflows). However, since communication platform 10 includes first acknowledgement device 18 (which provides the acknowledgements of data transfers to sending device 24), communication platform 10 and control process 50 may control the transfer rate of the individual dataflows within plurality of dataflows 38.

Specifically and through the use of first acknowledgement device 18, sending device 24 can theoretically double their transfer rate every 2.0 milliseconds, as opposed to every 64.0 milliseconds in the traditional (i.e., prior art) communication platform that does not include first acknowledgement device 18. And through the use of RWND and acknowledgement delays, the transfer rates of the dataflows within plurality of dataflows 38 may be controlled.

Continuing with the above-stated example in which dataflow 30 just transmitted one-hundred-twenty-eight packets of file 38; for the next data transfer, sending device 24 would want to transfer two-hundred-fifty-six data packets. However, sending device 24 will only be able to send out as many data packets as RWND specifies they can. Additionally sending device 24 will not be able to send out any data packets until sending device 24 receives an acknowledgement of receipt from first acknowledgement device 18 concerning the one-hundred-twenty-eight data packets that were just transmitted.

Specifically and when increasing 104 the transfer rate of the dataflow (e.g., dataflow 30), control process 50 may increase 108 the RWND value associated with the dataflow (e.g., dataflow 30) and/or decrease 110 an acknowledgement delay associated with the dataflow (e.g., dataflow 30). Accordingly, control process 50 may increase 108 the RWND for dataflow 30 to e.g., two-hundred data packets, thus allowing sending device 24 to send two-hundred data packets during the next data transfer. And since control process 50 wants to increase the transfer rate of dataflow 30, control process 50 may decrease 110 (or eliminate) any acknowledgement delay associated with dataflow 30. Typically, dataflow process 10 may allow the transfer rate of e.g., plurality of dataflows 38 to be repeatedly increased until the occurrence of one or more of the conditions stated above (at which point a steady transfer rate may be retained), thus maximizing the bandwidth utilization of communication trunk 12.

Figure 3:
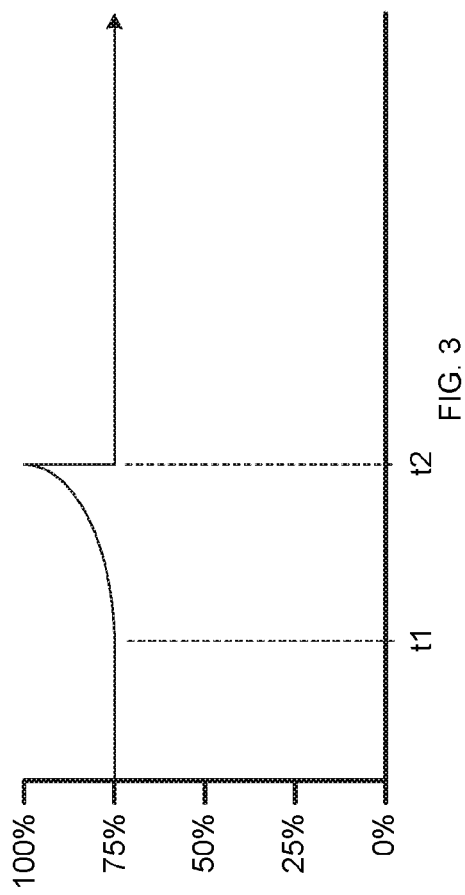
FIG. 3 is a diagrammatic view of a procedure implemented by the control process of FIG. 1.

And as network conditions may change over time (e.g., a load reduction on an overloaded router/switch that was dropping packets), control process 50 may periodically attempt to increase the rate of a discrete dataflow (e.g., dataflow 30) above the steady transfer rate discussed above. Referring also to FIG. 3, there is shown one embodiment of the manner in which control process 50 may attempt to increase the rate of e.g., dataflow 30. For example, control process 50 may begin (at time t1) to raise the rate of e.g., dataflow 30 until a packet loss is sensed (at time t2). At this point in time, the rate of dataflow 30 may be reduced to e.g., a level at which packet loss was not occurring.

Continuing with the above-stated example, in the event of: a loss of data packets between sending device 24 and first acknowledgement device 18 or a loss of data packets between receiving device 28 and second acknowledgement device 20; control process 50 may decrease 106 the rate of one or more dataflows within wired communication trunk 12. These losses of data packets may occur when e.g., router/switch 22 and/or router/switch 26 become overloaded and start dropping data packets (resulting in data packet loss).

Specifically and when decreasing 106 the rate of a dataflow (e.g., dataflow 30), control process 50 may decrease 112 an RWND value associated with the dataflow (e.g., dataflow 30) and/or increase 114 an acknowledgement delay associated with the dataflow (e.g., dataflow 30). Accordingly, control process 50 may decrease 112 the RWND for dataflow 30 to e.g., one-hundred data packets, thus allowing sending device 24 to send only one-hundred data packets during the next data transfer. And since control process 50 wants to decrease the transfer rate of dataflow 30, control process 50 may increase 114 any acknowledgement delay associated with dataflow 30 (e.g., by 10 milliseconds, 20 milliseconds, 30 milliseconds or 40 milliseconds), thus delaying (in milliseconds) the amount of time between when (in this example) first acknowledgement device 18 receives a quantity of data packets from sending device 24 and when first acknowledgement device 18 acknowledges receipt of that quantity of data packets.

As stated above, in the event that data packets of a discrete dataflow (e.g., dataflow 30) are being stored within e.g., second acknowledgement device 20, this is indicative of data being transferred to receiving device 28 at a rate that is quicker than receiving device 28 can handle. During operation of communication platform 10, when data packets are received on first acknowledgement device 18, they are immediately provided to second acknowledgement device 20, wherein the received data packets are stored in temporary storage (e.g., buffers) within second acknowledgement device 20. Second acknowledgement device 20 may then provide these data packets to receiving device 28 as quickly as receiving device 28 can accept them. In a manner similar to that described above, receiving device 28 may utilize RWND and acknowledgement delays to regulate the rate at which these data packets are transferred to receiving device 28. Accordingly, in the event that receiving device 28 cannot accept these data packets at the rate at which second acknowledgement device 20 is receiving them from first acknowledgement device 18, the temporary storage within second acknowledgement device 18 may begin to fill up. Accordingly, control process 10 may decrease 106 the rate of the dataflow (e.g., dataflow 30) by an amount (and for a duration) that will either a) stop the filling of the temporary storage within second acknowledgement device 20 or may b) allow for the emptying of the temporary storage within second acknowledgement device 20.

Figure 4:
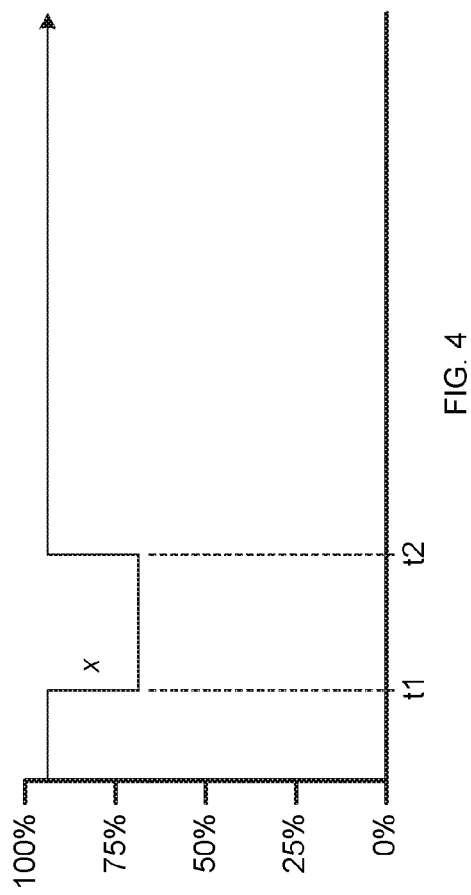
FIG. 4 is a diagrammatic view of another procedure implemented by the control process of FIG. 1.

Referring also to FIG. 4, there is shown one embodiment of the manner in which control process 50 may react in response to data packets of a discrete dataflow (e.g., dataflow 30) being stored within e.g., second acknowledgement device 20. For example and upon control process 10 determining that data packets are being stored within second acknowledgement device 20; at time t1, control process 50 may reduce the transfer rate of dataflow 30 by "x" for a defined period of time (e.g., until time t2).

As discussed above, in the event that the actual bandwidth utilization of wired communication trunk 12 exceeds a target bandwidth utilization for wired communication trunk 12, control process 50 may decrease 106 the rate of one or more dataflows within wired communication trunk 12. Accordingly, control process 50 may determine 116 an actual bandwidth utilization of wired communication trunk 12. When determining 116 an actual bandwidth utilization for wired communication trunk 12, control process 50 may determine the quantity of data being transmitted from first acknowledgement device 18 to second acknowledgement device 20. Determining 116 bandwidth utilization by determining the actual data transmitted by first acknowledgement device 18 tends to be more accurate than summing the dataflows included within e.g., plurality of dataflows 38, as additional housekeeping data packets (which may be encapsulated in GRE (i.e., generic routing encapsulation) packets) may be transferred between acknowledgments devices 18, 20.

For the following example, assume that wired communication trunk 12 is a 10.00 gigabit communication trunk and the target utilization for this communication trunk is 95%. First acknowledgement device 18 would be configured/designed for the 10.00 gigabit capacity of wired communication trunk 12 and, therefore, would be aware of this 10.00 gigabit capacity. Accordingly, if control process 50 determines 116 that e.g., 9.80 gigabits of data are being transferred through wired communication trunk 12 (which is 98% and exceeds the 95% target utilization), control process 50 may decrease 106 the rate of one or more dataflows within wired communication trunk 12. Typically and when decreasing 106 data transfer rates due to over utilization of a communication trunk, the decrease will be applied to all of the dataflows included within e.g., plurality of dataflows 38. Accordingly, control process 50 may decrease 112 an RWND value associated with each dataflow included within plurality of dataflows 38 and/or increase 114 an acknowledgement delay associated with each dataflow included within plurality of dataflows 38 to reduce the utilization of wired communication trunk 12.

When controlling the rate of a dataflow within wired communication trunk 12, various variables over and above RWND and acknowledgement delay may be used to regulate the transfer rate of a dataflow. Specifically, the rate of a dataflow may be defined as follows:

$$\text{Rate} = 2^{SSCL}\left(\frac{RWND}{SMSS}\right)LEN\left(\frac{LRTT}{DLAY}\right)$$

wherein:

SSCL is the receive window scaling factor, wherein when a dataflow is established, an SSCL is defined that allows for the exponential expansion of the default 16 bit window size;

RWND is the Receiver Window that is discussed above;

SMSS is the data size;

LEN is the packet size;

LRTT is the local round trip delay between e.g., sending device 24 and first acknowledgement device 18; and DLAY is the acknowledgement delay that is discussed above.

In accordance with the above-described equation and by varying RWND and acknowledgement delays in the manner discussed above, the rate of one or more dataflows within wired communication trunk 12 may be varied/controlled.

Dataflow Prioritization Methodology:

When a plurality of dataflows (e.g., plurality of dataflows 38) are passing through wired communication trunk 12, priority may be given to certain dataflows over other dataflows. For example, dataflows concerning certain procedures may be prioritized (e.g., the restoration of a destroyed data site); dataflows concerning certain clients may be prioritized (e.g., clients offering streaming video services); and dataflows concerning certain governmental organizations may be prioritized (e.g., Police, Fire, Military, FEMA, TSA, DHS, ATF, ICE, and Amber Alerts).

Figure 5:
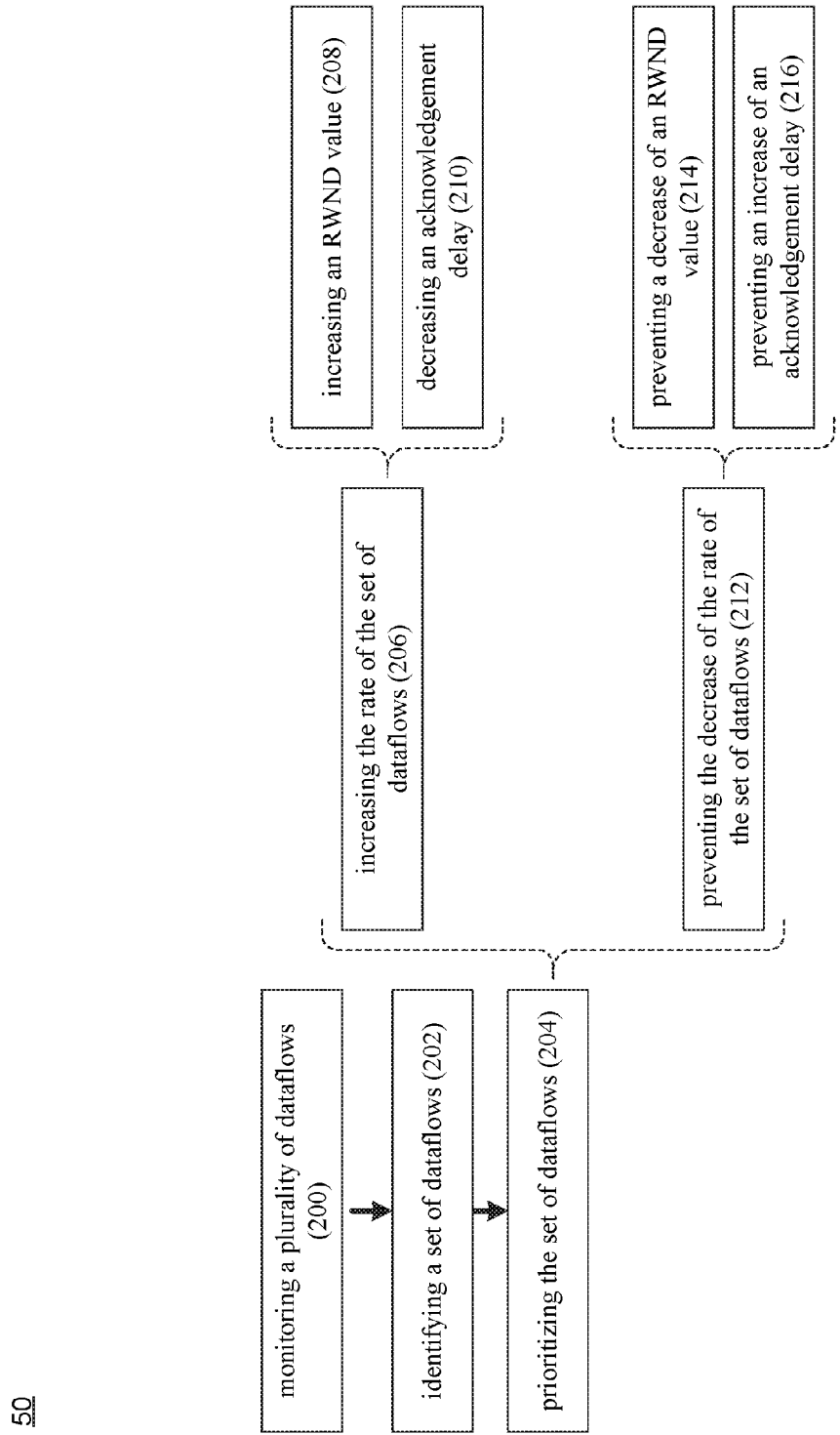
FIG. 5 is a flow chart of another embodiment of the control process of FIG. 1.

Accordingly and referring also to FIG. 5, control process 50 may monitor 200 a plurality of dataflows (e.g., plurality of dataflows 38) within wired communication trunk 12 to identify 202 a set of dataflows (e.g., dataflow set 56), chosen from plurality of dataflows 38, for prioritization. Dataflow set 56 may include a single dataflow or may include a plurality of dataflows.

As discussed above and in a traditional (i.e., prior art) communication platform that does not include first acknowledgement device 18 and second acknowledgement device 20, centralized regulation of dataflows within a communication platform was not possible. However, since wired communication platform 12 includes acknowledgement devices 18, 20, control process 50 may prioritize 204 dataflow set 56.

When prioritizing 204 the set of dataflows (e.g., dataflow set 56), control process 50 may increase 206 the rate of dataflow set 56, wherein increasing 206 the rate of the set of dataflows (e.g., dataflow set 56) may include increasing 208 the RWND value associated with dataflow set 56 (in the manner described above) and/or decreasing 210 the acknowledgement delay associated with dataflow set 56 (in the manner described above).

Additionally/alternatively, when prioritizing 204 the set of dataflows (e.g., dataflow set 56), control process 50 may prevent 212 the decrease of the rate of dataflow set 56, wherein preventing 212 the decrease of the rate of the set of dataflows (e.g., dataflow set 56) may include preventing 214 a decrease of the RWND value associated with dataflow set 56 and/or preventing 216 an increase of an acknowledgement delay associated with dataflow set 56.

Figure 6:
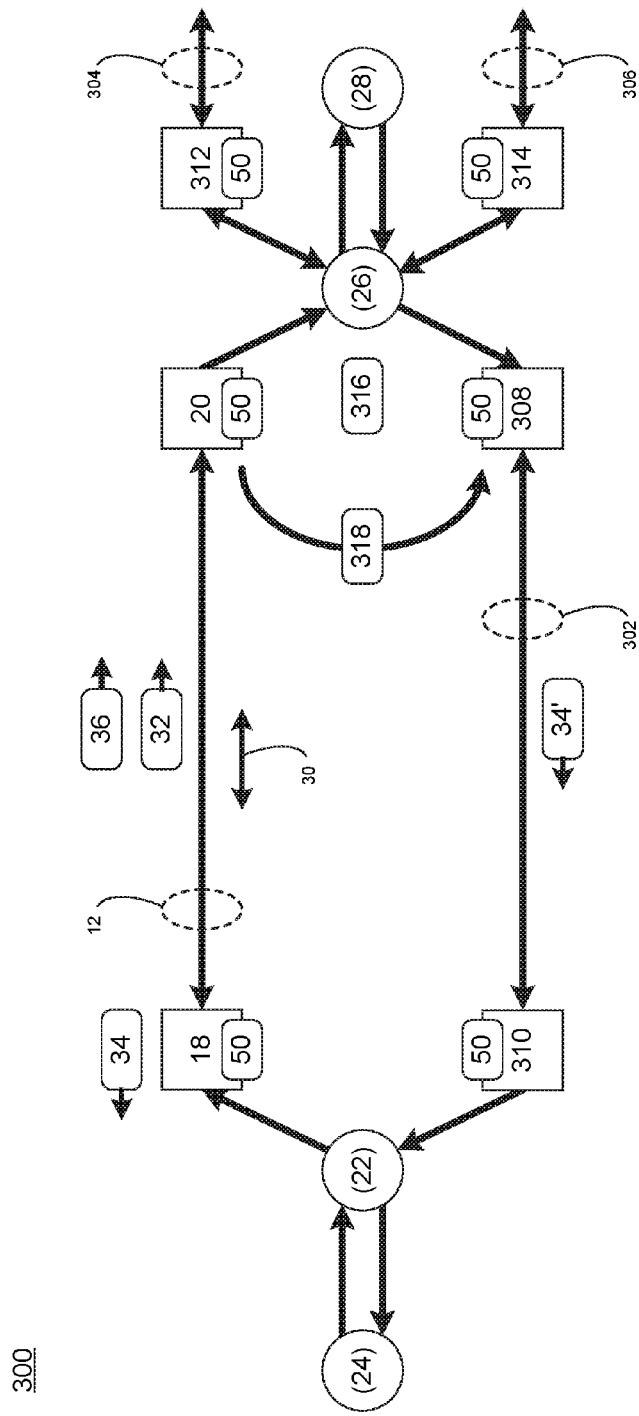
FIG. 6 is a diagrammatic view of another embodiment of the wired communication platform of FIG. 1.

Data Redirection in a Bifurcated Communication Trunk Methodology:

Referring also to FIG. 6, there is shown communication platform 300 that includes a plurality of wired communication trunks, namely wired communication trunk 12, wired communication trunk 302, wired communication trunk 304, and wired communication trunk 306. As discussed above, each of communication trunks 12, 302, 304, 306 may include a pair of acknowledgement device. For example, wired communication trunk 12 is shown to include first acknowledgement device 18 and second acknowledgement device 20; wired communication trunk 302 is shown to include first acknowledgement device 308 and second acknowledgement device 310; wired communication trunk 304 is shown to include first acknowledgement device 312 (wherein a second acknowledgement device is not shown); and wired communication trunk 306 is shown to include first acknowledgement device 314 (wherein a second acknowledgement device is not shown).

As discussed above, when a dataflow (e.g., dataflow 30) is established, a triple handshake procedure may be employed, wherein sending device 24 may send a packet (e.g., synchronize (SYN) packet 32) to receiving device 28; synchronization acknowledgement (SYN-ACK) packet 34 may be received by sending device 24; and sending device 24 may send acknowledgement (ACK) packet 36 to receiving device 28; thus establishing dataflow 30.

Typically, the same wired communication trunk is used for both outbound data packets and inbound data packets. However, sometimes the outbound path may be different than the inbound path. For the following example, assume that router/switch 22 determined that the best path from sending device 24 to receiving device 28 was through wired communication trunk 12, while router/switch 26 determined that the best path from receiving device 28 to sending device 24 was through wired communication trunk 302.

Accordingly and when establishing dataflow 30, sending device 24 may send SYN packet 32 to receiving device 28 via wired communication trunk 12. However, receiving device 28 may send SYN-ACK packet 34' to sending device 24 via wired communication trunk 302. Therefore, first acknowledgement device 308 of wired communication trunk 302 may receive SYN-ACK packet 34' for which it did not receive a corresponding SYN packet (namely SYN packet 32 that was initially received by first acknowledgement device 18 of wired communication trunk 12 and provided to second acknowledgement device 20 of wired communication trunk 12). If this happens, problems may occur since e.g., first acknowledgement device 18 of wired communication path 12 would never receive confirmation that SYN packet 32 actually reached receiving device 28 and, therefore, first acknowledgement device 18 would never delete its stored copy of SYN packet 32. Accordingly, control process 50 may monitor activity within communication platform 300 for such a situation.

Figure 7:
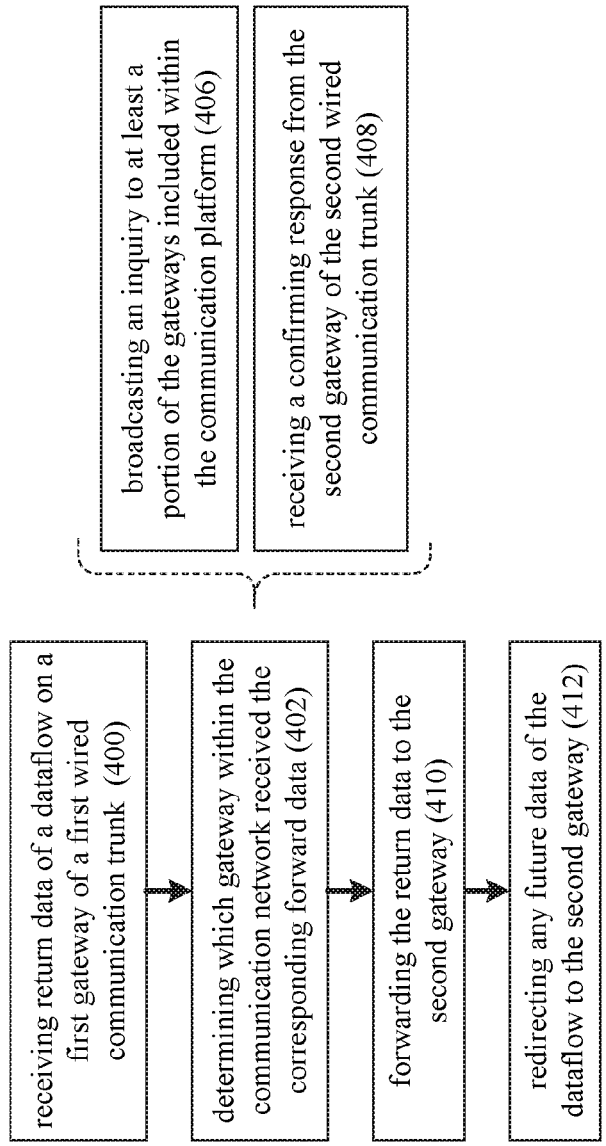
FIG. 7 is a flow chart of another embodiment of the control process of FIG. 1.

Referring also to FIG. 7, upon receiving 400 return data (e.g., SYN-ACK packet 34') of dataflow 30 on first acknowledgement device 308 of wired communication trunk 302 within communication platform 300, control process 50 may determine if it received the corresponding forward data (namely SYN packet 32). If corresponding forward data (namely SYN packet 32) of e.g., dataflow 30 was not received on first acknowledgement device 308, control process 50 may determine 402 which acknowledgement device within communication platform 300 received the corresponding forward data (namely SYN packet 32). In this particular example and as discussed above, the acknowledgement device that received the corresponding forward data (namely SYN packet 32) was second acknowledgement device 20 of wired communication trunk 12 within communication platform 300.

When determining 402 which acknowledgement device within communication platform 300 received the corresponding forward data (namely SYN packet 32), control process 50 may broadcast 404 inquiry 316 to at least a portion of the acknowledgement devices included within communication platform 300. For example, control process 50 may broadcast 404 inquiry 316 to acknowledgement devices 20, 312, 314 included within communication platform 300. Further and when determining 402 which acknowledgement device within communication platform 300 received the corresponding forward data (namely SYN packet 32), control process 50 may receive 408 confirming response 318 from second acknowledgement device 20 of wired communication trunk 12 within communication platform 30.

Upon receiving 406 confirming response 318 from second acknowledgement device 20, control process 50 may forward 410 the return data (e.g., SYN-ACK packet 34') to second acknowledgement device 20 of wired communication trunk 12, resulting in SYN-ACK packet 34' being forwarded to first acknowledgement device 18 for processing (e.g., the clearing of stored packet copies, as discussed above). Further, control process 50 may redirect 412 any future data of dataflow 30 to second acknowledgement device 20 of wired communication trunk 12, wherein examples of this future data may include but is not limited to one or more of an acknowledgement (ACK) packet and a data packet.

Figure 8:
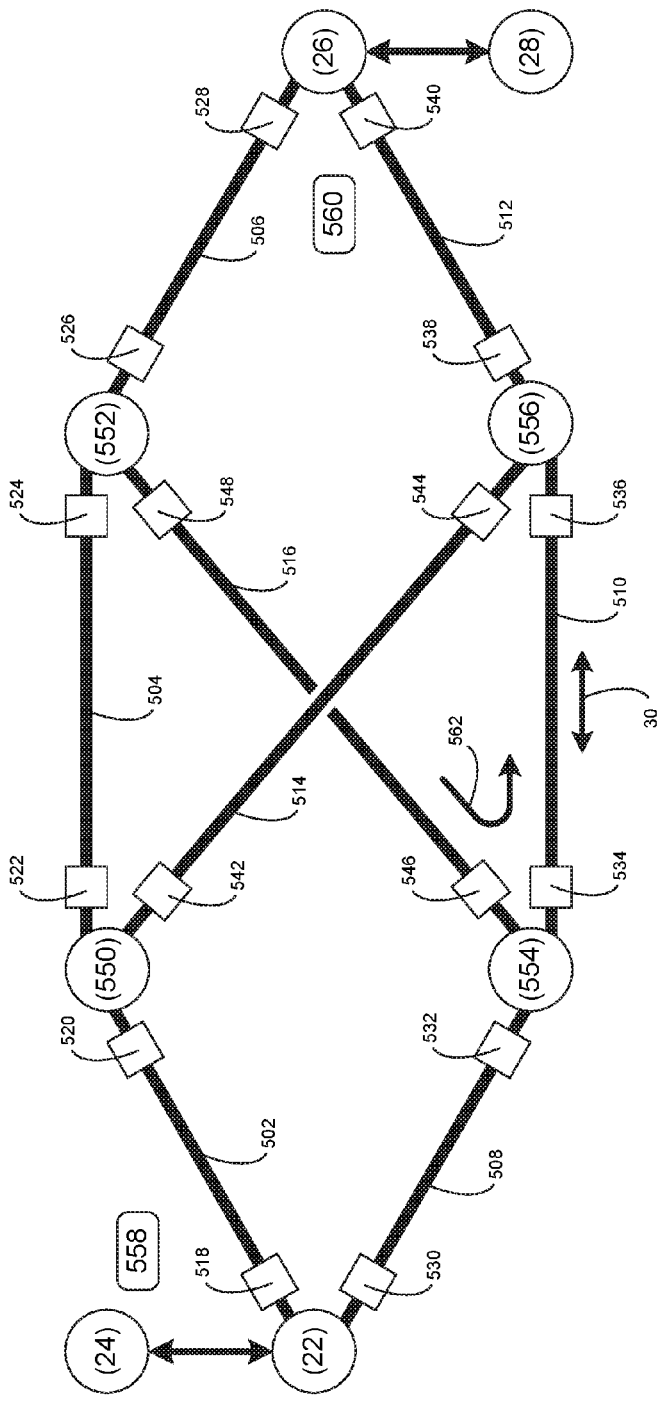
FIG. 8 is a diagrammatic view of another embodiment of the wired communication platform of FIG. 1.

Multi-Trunk Dataflow Regulation Methodology:

Referring also to FIG. 8, there is shown communication platform 500 that includes a plurality of wired communication trunks, namely wired communication trunks 502, 504, 506, 508, 510, 512, 514, 516. As discussed above, each of communication trunks 502, 504, 506, 508, 510, 512, 514, 516 includes a pair of acknowledgement device, wherein:

wired communication trunk 502 is shown to include first acknowledgement device 518 and second acknowledgement device 520;

wired communication trunk 504 is shown to include first acknowledgement device 522 and second acknowledgement device 524;

wired communication trunk 506 is shown to include first acknowledgement device 526 and second acknowledgement device 528;

wired communication trunk 508 is shown to include first acknowledgement device 530 and second acknowledgement device 532;

wired communication trunk 510 is shown to include first acknowledgement device 534 and second acknowledgement device 536;

wired communication trunk 512 is shown to include first acknowledgement device 538 and second acknowledgement device 540;

wired communication trunk 514 is shown to include first acknowledgement device 542 and second acknowledgement device 544; and wired communication trunk 516 is shown to include first acknowledgement device 546 and second acknowledgement device 548.

Router/switch 22 may be configured to couple sending device 24 to communication platform 500 and router/switch 26 may be configured to couple receiving device 28 to communication platform 500. Further, router/switches 550, 552, 554, 556 may be configured to couple communication trunks 502, 504, 506, 508, 510, 512, 514, 516 within communication platform 500.

As discussed above, when a dataflow (e.g., dataflow 30) is established, a triple handshake procedure may be employed, wherein sending device 24 may send a packet (e.g., synchronize (SYN) packet 32) to receiving device 28; synchronization acknowledgement (SYN-ACK) packet 34 may be received by sending device 24; and sending device 24 may send acknowledgement (ACK) packet 36 to receiving device 28; thus establishing dataflow 30. However and in communication platform 500, multiple wired communication trunks must be utilized to get from sending device 24 to receiving device 28, regardless of the path chosen by the various router/switches within communication platform 500.

Accordingly and when establishing dataflow 30 through communication platform 500, various packets (e.g., SYN packet 32, SYN-ACK packet 34, ACK packet 36, and data packets) are transferred between wired communication trunks via the router/switches that couple them. Accordingly, if dataflow 30 utilized wired communication trunks 508, 510, 512, a data packet (e.g., data packet 558) being transferred from sending device 24 to receiving device 28 would occur as follows:

data packet 558 would be received by router/switch 22 and provided to first acknowledgement device 530 (which would acknowledge receipt of data packet 558 to sending device 24);
 data packet 558 would be received by second acknowledgement device 532 and provided to router/switch 554;
 data packet 558 would be received by router/switch 554 and provided to first acknowledgement device 534 (which would acknowledge receipt of data packet 558 to first acknowledgement device 530);
 data packet 558 would be received by second acknowledgement device 536 and provided to router/switch 556;
 data packet 558 would be received by router/switch 556 and provided to first acknowledgement device 538 (which would acknowledge receipt of data packet 558 to first acknowledgement device 534);
 data packet 558 would be received by second acknowledgement device 540 and provided to router/switch 26; and
 data packet 558 would be received by router/switch 26 and provided to receiving device 38 (which would acknowledge receipt of data packet 558 to first acknowledgement device 538).

As discussed above, control process 50 may be configured to control the transfer rate of discrete dataflows (e.g., dataflow 30) through the use of an RWND value and acknowledgement delays. Accordingly, control process 50 and communication platform 500 needs to be configured to allow such rate control information to pass between separate and distinct wired communication trunks. In this particular example and with respect to dataflow 30, these wired communication trunks include separate and distinct wired communication trunks 508, 510, 512.

Figure 9:
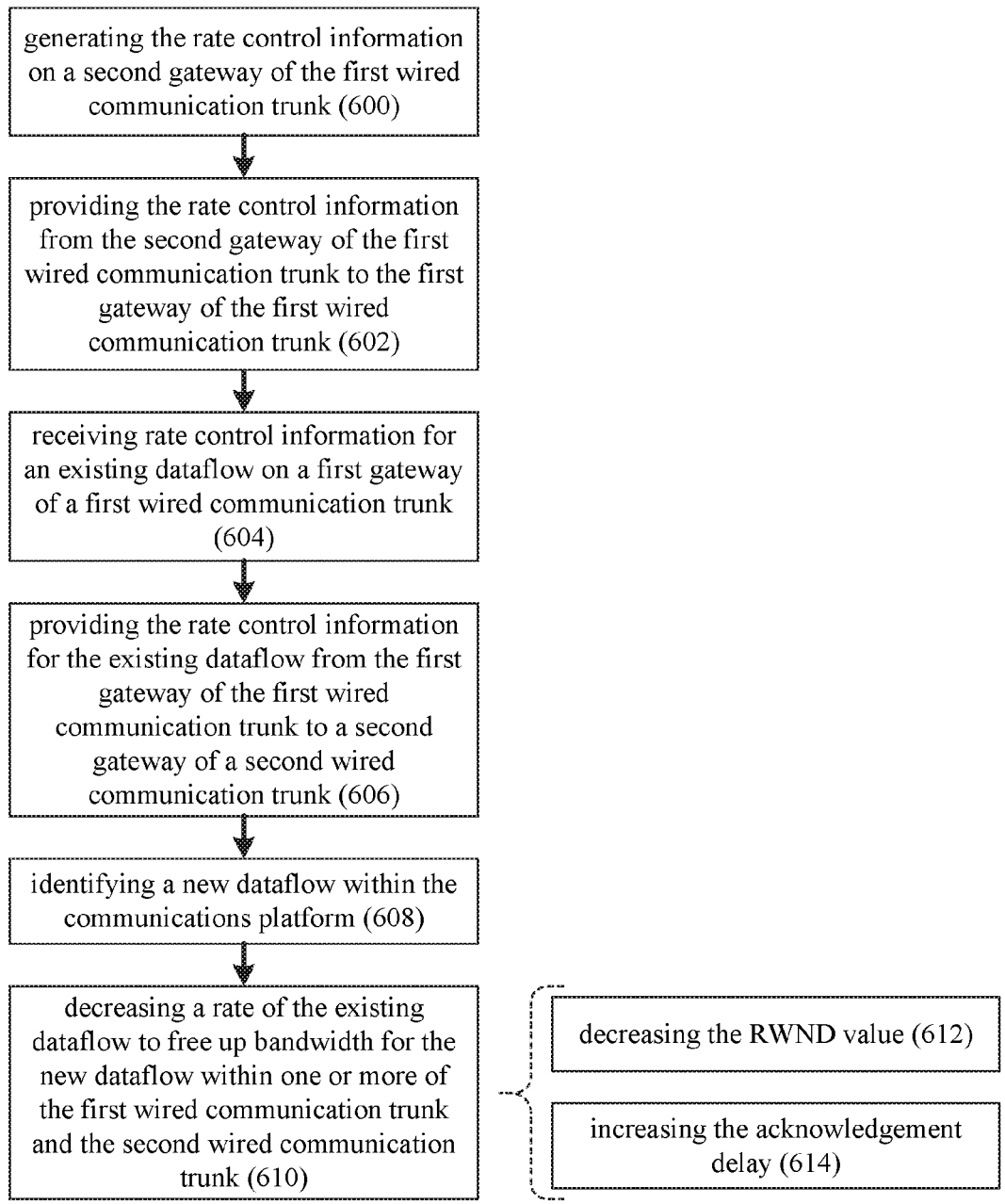
FIG. 9 is a flow chart of another embodiment of the control process of FIG. 1.

Accordingly and referring also to FIG. 9, control process 50 may generate 600 rate control information (e.g., rate control information 560) for an existing dataflow (e.g., dataflow 30) on a second acknowledgement device (e.g., second acknowledgement device 540) of a first wired communication trunk (e.g., wired communication trunk 512) within communication platform 500. As discussed above, examples of rate control information 560 may include but are not limited to the RWND value and/or the acknowledgement delays, wherein the value of RWND and the acknowledgement delays may be varied depending upon various factors such as a desired rate for a data flow, packet loss within a particular data flow, and the overall congestion of one or more of (in this example) wired communication trunks 508, 510, 512.

Control process 50 may then provide 602 rate control information 560 for dataflow 30 from second acknowledgement device 540 to first acknowledgement device 538 of wired communication trunk 512.

Control process 50 may receive 604 rate control information 560 for dataflow 30 on first acknowledgement device 538 of wired communication trunk 512 and may provide 606 rate control information 560 from first acknowledgement device 538 of wired communication trunk 512 to a second acknowledgement device (e.g., second acknowledgement device 536 of a second wired communication trunk (e.g., wired communication trunk 510) within communication platform 500.

Since the intended recipient of rate control information 560 is sending device 24, this process may be repeated until rate information 560 is received by first acknowledgement device 530, which (as discussed above) may control the rate at which sending device 24 provides data within dataflow 30.

Assume for this example that another dataflow (e.g., dataflow 562) is established that flows through wired communication trunk 516, through router/switch 554 and into wired communication trunk 510. Also suppose that just prior to the initiation of dataflow 562, wired communication trunk 510 was at 95% capacity (e.g., the target utilization for wired communication trunk 510) and the bandwidth of dataflow 562 would put the utilization of wired communication trunk over this 95% utilization target.

Accordingly and continuing with the above stated example, control process 50 may identify 608 a new dataflow (e.g., dataflow 562) within communication platform 500. If dataflow 562 can be handled by wired communication trunk 510 without being over utilized, nothing will need to change with respect to dataflow 30. However, if the addition of dataflow 562 within wired communication trunk 510 results in over utilization of wired communication trunk 510, control process 50 may decrease 610 the rate of an existing dataflow (e.g., dataflow 30) to free up bandwidth for the new dataflow (e.g., dataflow 562) within one or more of the wired communication trunks. For example, assume that the addition of dataflow 562 over-utilizes wired communication trunk 510 but does not over-utilize wireless communication trunk 512.

When decreasing 610 the rate of the existing dataflow (e.g., dataflow 30), control process 10 may decrease 612 the RWND value (as previously discussed) and/or increase 614 the acknowledgement delay (as previously discussed).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 18).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising
receiving first rate control information for an existing TCP dataflow on a first gateway of a first wired communication trunk within a communication platform, the first rate control information indicating an available transfer rate for the existing TCP dataflow by the first wired communication trunk;

providing the first rate control information for the existing TCP dataflow from the first gateway of the first wired communication trunk to a second gateway of a second wired communication trunk within the communication platform;

generating second rate control information for the existing TCP dataflow by the second gateway of the second wired communication trunk within the communication platform, the second rate control information indicating an available transfer rate for the existing TCP dataflow by the second wired communication trunk; and providing the lesser of the first rate control information and the second rate control information to a device within the communication platform upstream in a direction of a sending device of the existing TCP dataflow relative to the second wired communication trunk.

2. The computer-implemented method of claim 1 further comprising:

generating the first rate control information on a second gateway of the first wired communication trunk.

3. The computer-implemented method of claim 2 further comprising:

providing the first rate control information from the second gateway of the first wired communication trunk to the first gateway of the first wired communication trunk.

4. The computer-implemented method of claim 1 further comprising:

identifying a new TCP dataflow within the communication platform.

5. The computer-implemented method of claim 4 further comprising:

decreasing a rate of the existing TCP dataflow to free up bandwidth for the new TCP dataflow within one or more of the first wired communication trunk and the second wired communication trunk.

6. The computer-implemented method of claim 5 wherein the one or more of first rate control information and the second rate control information includes one or more of:

a receiver window (RWND) value associated with the existing dataflow; and an acknowledgement delay associated with the existing dataflow.

7. The computer-implemented method of claim 6 wherein the intended recipient of the lesser of the first rate control information and the second rate control information is the sending device coupled to the communication platform.

8. The computer-implemented method of claim 6 wherein decreasing the rate of the existing TCP dataflow includes one or more of:

decreasing the receiver window (RWND) value; and increasing the acknowledgement delay.

9. A computer program product residing on a non-transitory computer readable medium having a plurality of instructions stored thereon which, when executed by a processor, cause the processor to perform operations comprising:

receiving first rate control information for an existing TCP dataflow on a first gateway of a first wired communication trunk within a communication platform, the first rate control information indicating an available transfer rate for the existing TCP dataflow by the first wired communication trunk;

providing the first rate control information for the existing TCP dataflow from the first gateway of the first wired communication trunk to a second gateway of a second wired communication trunk within the communication platform;

generating second rate control information for the existing TCP dataflow by the second gateway of the second wired communication trunk within the communication platform, the second rate control information indicating an available transfer rate for the existing TCP dataflow by the second wired communication trunk; and providing the lesser of the first rate control information and the second rate control information to a device within the communication platform upstream in a direction of a sending device of the existing TCP dataflow relative to the second wired communication trunk.

10. The computer program product of claim 9 further comprising:

generating the first rate control information on a second gateway of the first wired communication trunk.

11. The computer program product of claim 10 further comprising:

providing the first rate control information from the second gateway of the first wired communication trunk to the first gateway of the first wired communication trunk.

12. The computer program product of claim 9 further comprising:

identifying a new TCP dataflow within the communication platform.

13. The computer program product of claim 12 further comprising:

decreasing a rate of the existing TCP dataflow to free up bandwidth for the new TCP dataflow within one or more of the first wired communication trunk and the second wired communication trunk.

14. The computer program product of claim 13 wherein the one or more of first rate control information and the second rate control information includes one or more of:

a receiver window (RWND) value associated with the existing dataflow; and an acknowledgement delay associated with the existing dataflow.

15. The computer program product of claim 14 wherein the intended recipient of the lesser of the first rate control information and the second rate control information is the sending device coupled to the communication platform.

16. The computer program product of claim 14 wherein decreasing the rate of the existing TCP dataflow includes one or more of:

decreasing the receiver window (RWND) value; and increasing the acknowledgement delay.

17. A computing system including a processor and memory configured to perform operations comprising:

receiving first rate control information for an existing TCP dataflow on a first gateway of a first wired communication trunk within a communication platform, the first rate control information indicating an available transfer rate for the existing TCP dataflow by the first wired communication trunk;

providing the first rate control information for the existing TCP dataflow from the first gateway of the first wired communication trunk to a second gateway of a second wired communication trunk within the communication platform;

generating second rate control information for the existing TCP dataflow by the second gateway of the second wired communication trunk within the communication platform, the second rate control information indicating an available transfer rate for the existing TCP dataflow by the second wired communication trunk; and providing the lesser of the first rate control information and the second rate control information from a first gateway of the second wired communication trunk to a device within the communication platform upstream in a direction of a sending device of the existing TCP dataflow relative to the second wired communication trunk.

18. The computing system of claim 17 further configured to perform operations comprising:
generating the first rate control information on a second gateway of the first wired communication trunk.

19. The computing system of claim 18 further configured to perform operations comprising:
providing the first rate control information from the second gateway of the first wired communication trunk to the first gateway of the first wired communication trunk.

20. The computing system of claim 17 further configured to perform operations comprising:
identifying a new TCP dataflow within the communication platform.

21. The computing system of claim 20 further configured to perform operations comprising:
decreasing a rate of the existing TCP dataflow to free up bandwidth for the new TCP dataflow within one or more of the first wired communication trunk and the second wired communication trunk.

22. The computing system of claim 21 wherein the one or more of the first rate control information and the second rate control information includes one or more of:
a receiver window (RWND) value associated with the existing dataflow; and
an acknowledgement delay associated with the existing dataflow.

23. The computing system of claim 22 wherein the intended recipient of the lesser of the first rate control information and the second rate control information is the sending device coupled to the communication platform.

24. The computing system of claim 22 wherein decreasing the rate of the existing dataflow includes one or more of:
decreasing the receiver window (RWND) value; and
increasing the acknowledgement delay.

* * * * *